(12) United States Patent
Lehikoinen et al.

(10) Patent No.: US 7,725,112 B2
(45) Date of Patent: May 25, 2010

(54) SYSTEM AND METHOD FOR PROVISION OF PROXIMITY NETWORKING ACTIVITY INFORMATION

(75) Inventors: Jaakko Lehikoinen, Hämeenkyrö (FI); Jussi Impiö, Pälkäne (FI); Severi Uusitalo, Hämeenlinna (FI); Timo K. Perälä, Helsinki (FI)

(73) Assignee: Nokia Corporation, Espoo (FI)

( * ) Notice: Subject to any disclaimer, the term of this patent is extended or adjusted under 35 U.S.C. 154(b) by 55 days.

(21) Appl. No.: 11/054,008

(22) Filed: Feb. 8, 2005

(65) Prior Publication Data

US 2006/0178214 A1    Aug. 10, 2006

(51) Int. Cl.
H04W 24/00    (2009.01)
H04M 3/42    (2006.01)
H04M 11/04    (2006.01)
H04L 29/06    (2006.01)

(52) U.S. Cl. .............. 455/456.1; 455/414.1; 455/414.2; 455/414.3; 455/404.2

(58) Field of Classification Search .............. 455/456.1, 455/414.1, 519, 456.2, 456.3, 41.2, 414, 455/414.2, 414.3; 709/223, 219; 713/168; 370/255

See application file for complete search history.

(56) References Cited

U.S. PATENT DOCUMENTS

| | | | |
|---|---|---|---|
| 5,629,981 A | 5/1997 | Nerlikar | |
| 5,959,530 A | 9/1999 | Lupien, Jr. et al. | |
| 5,987,421 A | 11/1999 | Chuang | |
| 6,647,497 B1 | 11/2003 | Cromer et al. | |
| 6,892,052 B2 | 5/2005 | Kotola et al. | |
| 2002/0044690 A1 | 4/2002 | Burgess | |
| 2002/0062284 A1 | 5/2002 | Kawan | |
| 2002/0084896 A1 | 7/2002 | Dixit et al. | |
| 2002/0120750 A1 | 8/2002 | Nidd | |
| 2002/0178216 A1 | 11/2002 | Walther et al. | |
| 2003/0030542 A1 | 2/2003 | VonHoffmann | |
| 2003/0037033 A1 | 2/2003 | Nyman et al. | |
| 2003/0069016 A1 | 4/2003 | Bahl et al. | |
| 2003/0074422 A1* | 4/2003 | Montemurro et al. | 709/219 |
| 2003/0105954 A1 | 6/2003 | Immonen et al. | |
| 2003/0144009 A1 | 7/2003 | Nowlin | |
| 2003/0167207 A1 | 9/2003 | Berardi et al. | |

(Continued)

FOREIGN PATENT DOCUMENTS

EP    1176840    1/2002

(Continued)

OTHER PUBLICATIONS

International Search Report of PCT Application No. PCT/IB2006/000207—Date of Completion of Search: May 23, 2006.

(Continued)

*Primary Examiner*—Nick Corsaro
*Assistant Examiner*—Shannon R Brooks
(74) *Attorney, Agent, or Firm*—Ditthavong Mori & Steiner, P.C.

(57) ABSTRACT

Systems and methods applicable, for instance, in proximity networking activity. For example, nodes and/or other computers may record, receive, and/or provide information regarding proximity networking activity. As another example, nodes and/or other computers may act to inform their users of proximity networking activity instances.

29 Claims, 6 Drawing Sheets

U.S. PATENT DOCUMENTS

| | | | |
|---|---|---|---|
| 2004/0023666 A1 | 2/2004 | Moon et al. | |
| 2004/0198386 A1* | 10/2004 | Dupray | 455/456.1 |
| 2004/0210624 A1 | 10/2004 | Andrzejak et al. | |
| 2004/0253979 A1* | 12/2004 | Burr | 455/552.1 |
| 2005/0170845 A1* | 8/2005 | Moran | 455/456.1 |
| 2005/0181803 A1* | 8/2005 | Weaver et al. | 455/456.1 |
| 2005/0193106 A1* | 9/2005 | Desai et al. | 709/223 |

FOREIGN PATENT DOCUMENTS

| | | |
|---|---|---|
| EP | 1199684 A2 | 4/2002 |
| EP | 1 239 630 A2 | 9/2002 |
| EP | 1 271 887 A1 | 1/2003 |
| GB | 2363289 | 12/2001 |
| WO | WO 99/41876 | 8/1999 |
| WO | WO 00/72506 | 11/2000 |
| WO | WO 01/45319 | 6/2001 |
| WO | WO 02/073874 A2 | 9/2002 |
| WO | WO 02/084896 A1 | 10/2002 |
| WO | WO 02/100065 A1 | 12/2002 |
| WO | WO 03/034664 | 4/2003 |
| WO | WO 2004/012352 A1 | 2/2004 |
| WO | WO 2004/038541 A3 | 5/2004 |
| WO | WO 2005/002703 A1 | 1/2005 |

OTHER PUBLICATIONS

Jan-Erik Ekberg, et al., "Connection Logic for a BlueTooth middleware", Jun. 3, 2004, pp. 1-10.

"Assigned Numbers", article [online], Bluetooth SIG, Inc., 1999-2001 [2 pages retrieved on Sep. 3, 2003]. Retrieved from the Internet: <http://www.bluetoothsig.org/assigned-numbers/>.

"Assigned Numbers—Bluetooth Baseband", article [online], Bluetooth SIG., Inc. 1999-2001 [2 pages retrieved on Sep. 3, 2003]. Retrieved from the Internet <http://www.bluetoothsig.org/assigned-numbers/baseband.htm>.

"Assigned Numbers—Link Manager Protocol (LMP)", article [online], Bluetooth SIG, Inc. 1999-2001 [1 page retrieved on Sep. 3, 2003]. Retrieved from the Internet <http://www.bluetoothsig.org/assigned-numbers/lmp.htm>.

"Assigned Numbers—Logical Link Control and Adaptation Protocol (L2CAP)", article [online], Bluetooth SIG., Inc. 1999-2001 [2 pages retrieved on Sep. 3, 2003]. Retrieved from the Internet <http://www.bluetoothsig.org/assigned-numbers/l2cap.htm>.

"Assigned Numbers—Service Discovery Protocol (SDP)", article [online], Bluetooth SIG., Inc. 1999-2001 [11 pages retrieved on Sep. 3, 2003]. Retrieved from the Internet <http://www.bluetoothsig.org/assigned-numbers/sdp.htm>.

"Assigned Numbers—Service Discovery Protocol (SDP)", article [online], Bluetooth SIG., Inc. 1999-2001 [5 pages retrieved on Sep. 3, 2003]. Retrieved from the Internet <http://www.bluetoothsig.org/assigned-numbers/host.htm>.

"Assigned Numbers—Company Identifiers", article [online], Bluetooth SIG., Inc. 1999-2001 [3 pages retrieved on Sep. 3, 2003]. Retrieved from the Internet <http://www.bluetoothsig.org/assigned-numbers/company.htm>.

"Assigned Numbers—References", article [online], Bluetooth SIG., Inc. 1999-2001 [6 pages retrieved on Sep. 3, 2003]. Retrieved from the Internet <http://www.bluetoothsig.org/assigned-numbers/tail.htm>.

"All About ISOC", web page [online], Internet Society, 2002 [2 pages retrieved on Oct. 23, 2003]. Retrieved from the Internet: <http://www.isoc.org/isoc/>.

"All About ISOC: Conferences—NDSS", web page [online], Internet Society, 2002 [1 page retrieved on Oct. 23, 2003]. Retrieved from the Internet: <http://www.isoc.org/isoc/conferences/ndss>.

"Internet Society (ISOC): All About The Internet", web page [online], Internet Society, 2002 [1 page retrieved on Oct. 10, 2003]. Retrieved from the Internet: <http://www.isoc.org/isoc/conferences/ndss/02/>.

"NDSS Conference Proceedings: 2002", web page [online], Internet Society [2 pages retrieved on Oct. 23, 2003]. Retrieved from the Internet: <http://www.isoc.org/isoc/conferences/ndss/02/proceedings/>.

Balfanz et al. "Talking to Strangers: Authentication in Ad-Hoc Wireless Networks", Xerox Palo Alto Research Center, (Date Unknown), 13 pages.

Kammer et al., "Bluetooth Application Developer's Guide: The Short Range Interconnect Solution", Syngress Publishing, Inc., 2002, pp. 1-68.

Bobba et al., Bootstrapping Security Associations for Routing in Mobile Ad-Hoc Workstations, IEEE Global Telecommunications Conference Proceedings; San Francisco, CA Dec. 1-5, 2003, IEEE Global Telecommunications Conference Proceedings, NY, NY: IEEE US, vol. 7 of 7; Dec. 1, 2003; pp. 1511-1513; GLOBCOM 2003; ISBN: 0-7803-7974-8.

"Windows NT Workstation"; Nov. 2, 2003; pp. 1-14; XP002323988; Retrieved from Internet: www.meetsoon.com/sid3.html; Apr. 11, 2005.

Kolsi et al.; "MIDP 2.0 Security Enhancements" System Sciences, 2004; Proceedings of the 37 Annual Hawaii International Conference on Jan. 5-8, 2004, Piscataway, NJ; IEEE, Jan. 5, 2004, pp. 287-294, XP010682881; ISBN: 0-7695-2056-1.

* cited by examiner

SYSTEM AND METHOD FOR PROVISION OF PROXIMITY NETWORKING ACTIVITY INFORMATION

FIELD OF INVENTION

This invention relates to systems and methods for provision of proximity networking activity information.

BACKGROUND INFORMATION

In recent times, there has been an increase in proximity networking activity. For example, many users have come to prefer proximity gaming over other forms of gaming, have come to prefer proximity messaging over other forms of messaging, and/or have come to prefer proximity media streaming over other forms of media distribution.

Accordingly, there may be interest in technologies that, for example, facilitate proximity networking activity.

SUMMARY OF THE INVENTION

According to embodiments of the present invention, there are provided systems and methods applicable, for instance, in proximity networking activity.

In various embodiments, nodes and/or other computers may record, receive, and/or provide information regarding proximity networking activity. Moreover, in various embodiments nodes and/or other computers may act to inform their users of proximity networking activity instances.

DETAILED DESCRIPTION OF THE INVENTION

General Operation

According to embodiments of the present invention there are provided systems and methods applicable, for instance, in proximity networking activity.

For example, in various embodiments nodes and/or other computers may record information regarding proximity networking activity instances in which they partake, may receive information regarding proximity networking activity from other nodes and/or other computers, and/or may provide information regarding proximity networking activity to other nodes and/or other computers.

As another example, in various embodiments nodes and/or other computers may act to inform their users of proximity networking activity instances, the nodes perhaps providing their users with corresponding geographical information.

Various aspects of the present invention will now be discussed in greater detail.

Recording of Information Regarding Proximity Networking Activity

According to various embodiments of the present invention a mobile node and/or other computer may act to record information regarding proximity networking activity instances in which it is partaking. Such proximity networking activity might, for example, include proximity gaming, proximity messaging, proximity media streaming (e.g., images, video, and/or audio), proximity grid computing, and/or proximity file sharing. Such proximity networking activity might, for instance, make use of Bluetooth, WiFi (e.g., 802.11g), and/or Ultra Wide Band (UWB).

Various information regarding a proximity networking activity instance may, in various embodiments, be recorded by the mobile node and/or other computer. Such information might, for example, include names, nicknames, and/or other identifiers corresponding to users participating in the proximity networking activity instance, numbers of users participating in the proximity networking activity instance, description of the proximity networking activity instance, indication of whether or not the proximity networking activity instance is open to new participants, indication of how long the proximity networking activity instance has been going on (e.g., elapsed time), one or more timestamps corresponding to the proximity networking activity instance, fees required for participating in the proximity networking activity instance, hardware, software, and/or memberships required for participating in the proximity networking activity instance, and/or geographical location information corresponding to the proximity networking activity instance (e.g., geographical coordinates and/or description provided by a user such as, for instance, location relative to a well-known landmark). It is noted that, in various embodiments, a nickname might be employed in the case where anonymity was desired.

Various operations might, in various embodiments, be performed by the mobile node and/or other computer in recording such information. For example, the mobile node and/or other computer might determine various of such information by employing one or more software modules that communicated with one or more software modules that allowed the mobile node and/or other computer's user to participate in the proximity networking activity.

Accordingly, for instance, in the case where the proximity networking activity was proximity gaming, the mobile node and/or other computer might employ one or more software modules that communicated with one or more software modules providing the gaming experience in order to learn from those software modules information such as, for example, one or more identifiers corresponding to the gaming participants, description of the proximity networking activity, and/or indication of how long the proximity networking activity has been going on.

As another example, the mobile node and/or other computer might determine various of such information by querying its user (e.g., via a graphical user interface (GUI) and/or other interface).

As yet another example, the mobile node and/or other computer might determine various of such information via use of hardware. Accordingly, for instance, the mobile node and/or other computer might employ Global Positioning System (GPS) hardware and/or networking hardware (e.g., Universal Mobile Telecommunications Service (UMTS) hardware) in order to determine geographical information corresponding to the proximity networking activity instance. In so making use of networking hardware the mobile node and/or other computer might, for example, act to query access points (e.g., base stations) for location information, to employ Enhanced Observed Time Difference (E-OTD), and/or the like.

It is noted that, in various embodiments a user participating in a proximity networking activity instance might be able to indicate, perhaps via a GUI and/or other interface provided by her mobile node and/or other computer, that some or all identifiers corresponding to her not be provided to other mobile nodes and/or other computers.

Exchange of Information Regarding Proximity Networking Activity

A mobile node and/or other computer may, according to various embodiments of the present invention, act to provide information regarding proximity networking activity to other mobile nodes and/or other computers, and/or may act to receive information regarding proximity networking activity from other mobile nodes and/or other computers. Initiation of such functionality might, in various embodiments, be automatic and/or be in response to user request. Such functionality may be implemented in a number of ways.

For example, mobile nodes and/or other computers capable of providing and/or receiving information regarding proximity networking activity might run one or more software modules that act to, for instance, respond to queries from other mobile nodes and/or other computers inquiring if capabilities of providing and/or receiving information regarding proximity networking activity were possessed. With respect to FIG. 1 it is noted that, according to various embodiments, mobile nodes and/or other computers capable of providing and/or receiving information regarding proximity networking activity might run one or more software modules that acted to, for instance, dispatch queries to other mobile nodes and/or other computers inquiring if capabilities of providing and/or receiving information regarding proximity networking activity were possessed (step 101).

Such queries and responses thereto could be communicated among mobile nodes and/or other computers in a number of ways. For instance, Remote Method Invocation (RMI), Java Messaging Service (JMS), Simple Object Access Protocol (SOAP), Object Exchange (OBEX) Object Push Profile (OPP), email, Multimedia Messaging Service (MMS), and/or Short Message Service (SMS) might be employed. It is noted that, in various embodiments, proximity connection (e.g., Bluetooth, WiFi, and/or UWB) might be employed for communication of such queries and responses thereto. Accordingly, in various embodiments, such queries might act to find mobile nodes and/or other computers in proximity connection range possessing capabilities of providing and/or receiving information regarding proximity networking activity.

Figure 1:
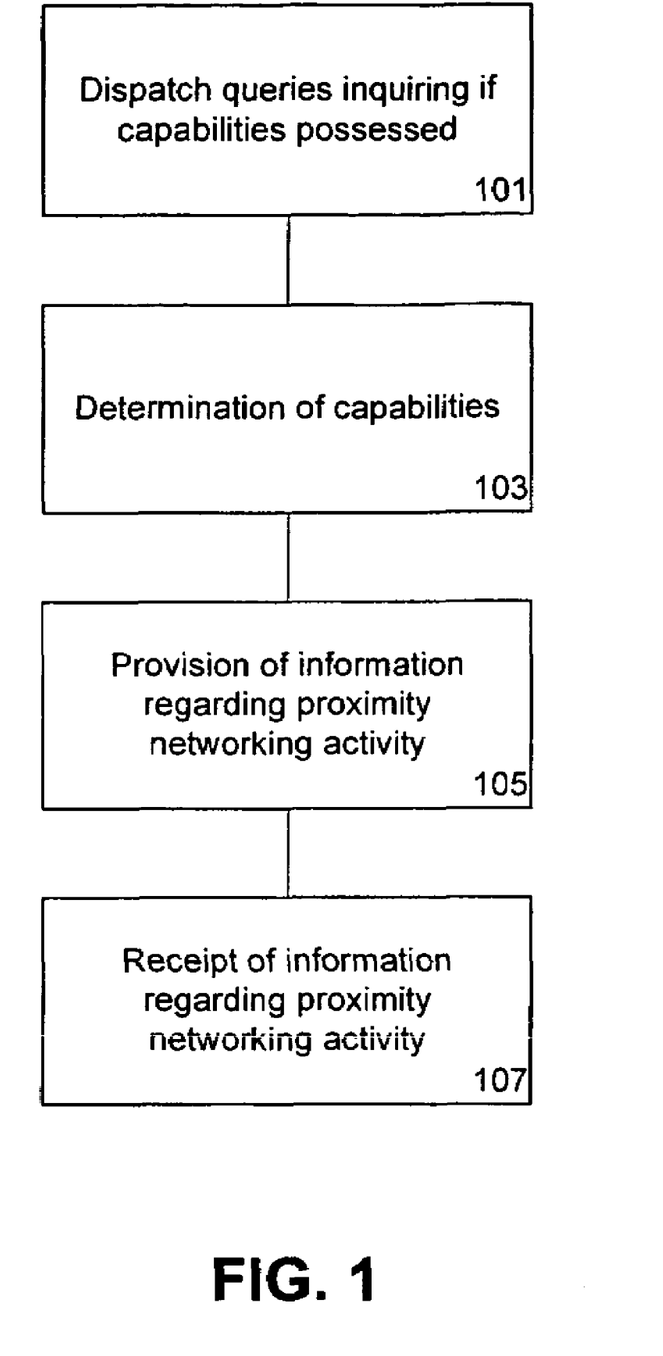
FIG. 1 shows exemplary steps involved in exchange of information regarding proximity networking activity according to various embodiments of the present invention.

According to embodiments of the present invention, perhaps in accordance with determination, via such queries and responses, of capabilities of mobile nodes and/or other computers for providing and/or receiving information regarding proximity networking activity (step 103), one or more operations could be performed whereby a mobile node and/or other computer possessing information regarding proximity networking activity could act to provide some or all of the information for receipt by another mobile node and/or other computer (step 105). The recipient node might, perhaps, already possess various information regarding proximity networking activity. The mobile node and/or other computer providing information regarding proximity networking activity might, perhaps, further receive information regarding proximity networking activity from the recipient mobile node and/or other computer (step 107).

It is noted that, in various embodiments, possessed information regarding proximity networking activity provided by a mobile node and/or other computer could include information regarding proximity networking activity recorded by that mobile node and/or other computer, and/or information regarding proximity networking activity received by that mobile node and/or other computer from another mobile node and/or other computer. It is further noted that, in various embodiments, a mobile node and/or other computer could act to perform one or more handling operations with respect to received information regarding proximity networking activity. For example, the mobile node and/or other computer might act to update already possessed information regarding proximity networking activity. Accordingly, various information of the sort discussed above (e.g., identifiers corresponding to participating users, numbers of users participating, indication of whether or not proximity networking activity instances are open to new participants, timestamps, and/or geographical location information) might, for instance, be updated.

The functionality whereby a mobile node and/or other computer could act to provide information regarding proximity networking activity for receipt by another mobile node and/or other computer could be implemented in a number of ways.

For instance, the mobile node and/or other computer could employ one or more software modules that acted to provide the information regarding proximity networking activity, with RMI, JMS, SOAP, OBEX OPP, email, MMS, and/or SMS perhaps being employed. It is noted that, in various embodiments, proximity connection (e.g., Bluetooth, WiFi, and/or UWB) might be employed. Moreover, in various embodiments a recipient mobile node and/or other computer might employ one or more software modules that acted to appropriately receive information regarding proximity networking activity.

It is noted that, according to various embodiments of the present invention, via the operations discussed herein mobile nodes and/or other computers could come to share with one another information regarding proximity networking activity that they had recorded, and/or had received from other mobile nodes and/or other computers.

Accordingly, for instance, a particular mobile node and/or other computer might come to possess not only the information regarding proximity networking activity that it had recorded itself, but also the information regarding proximity networking activity that had been recorded by each of a plurality of other mobile nodes and/or other computers. Thus, the mobile node and/or other computer might, for example, come to be aware of a number of instances of proximity networking activity (e.g., proximity gaming), the geographical locations associated with those instances, and/or additional information regarding those instances.

It is noted that, in various embodiments, a mobile node and/or other computer might perform one or more operations to determine if one or more software modules it possessed were also possessed by another mobile node and/or other computer (e.g., one in proximity communications range).

Such functionality might be implemented in a number of ways. For example, one or more software modules running on a mobile node and/or other computer might act to have one or more communications, inquiring as to the possession of one or more particular software modules, dispatched to another node and/or other computer. In the case where the other node and/or other computer was running the one or more modules in question, one or more software modules running on the other node and/or other computer might act to have an affirmative response sent to the inquiring node and/or other computer. Such operations might, for example, involve the use of RMI, JMS, SOAP, OBEX OPP, email, MMS, and/or SMS. Moreover, such operations might, perhaps, involve proximity connection (e.g., Bluetooth, WiFi, and/or UWB).

It is noted that, in various embodiments, one or more operations for activating one or more software modules may be performed. For example, where queries found a mobile node and/or other computer to possess capabilities of providing and/or receiving information regarding proximity networking activity, one or more appropriate software modules (e.g., ones involved in such providing and/or receiving) might be activated. For instance, a mobile node and/or other computer receiving such queries and/or affirmatively responding to such queries might act to activate such software modules.

As another example, in the case where proximity networking activity information identifying a proximity networking activity instance not previously known by a mobile node and/or other computer (e.g., an instance in the present vicinity of the mobile node and/or other computer) was received, the mobile node and/or other computer might act to activate proximity networking activity software employable in participation in the activity (e.g., proximity gaming software). It is noted that, in various embodiments, appropriate software modules might subscribe to appropriate interprocess communication notifications.

It is additionally noted that, in various embodiments, a user's mobile node and/or other computer might act to inform her, perhaps via a GUI and/or other interface, of receipt of proximity networking activity information identifying a proximity networking activity instance not previously known by the mobile node and/or other computer. Text, images, and/or audio describing the instance might, perhaps, be provided to the user by her mobile node and/or other computer.

Further, it is noted that, in various embodiments, a user could, for example, specify (e.g., via GUI and/or other interface) that her mobile node and/or other computer should act to acquire information regarding proximity networking activity from other mobile nodes and/or other computers but not provide such information, or that her mobile node and/or other computer should act to provide information regarding proximity networking activity to other mobile nodes and/or other computers but not receive such information.

As further examples, a user could, in various embodiments, specify that her mobile node and/or other computer should act to communicate only with known mobile nodes and/or other computers (e.g., ones specified by the user, belonging to users listed in an address book of the user, and/or with which the mobile node and/or other computer had previously communicated), with mobile nodes and/or other computers of users that are members of certain groups (e.g., one or more peer-to-peer groups of which the user is a member), and/or with mobile nodes and/or other computers that are set to be discoverable. As yet another example, a user could, in various embodiments, specify that her mobile node and/or other computer should provide none of her personal information to other mobile nodes and/or other computers.

It is noted that, in various embodiments, Nokia Wild Middleware and/or other middleware may be employed in various operations. Additional information regarding Nokia Wild Middleware may be found, for instance, in pending U.S. application Ser. No. 10/284,135, entitled "Device Detection and Service Discovery System and Method For a Mobile Ad Hoc Communications Network" and filed Oct. 31, 2002, and in pending U.S. application Ser. No. 10/662,407, entitled "Device Detection and Service Discovery System and Method For a Mobile Ad Hoc Communications Network" and filed Sep. 16, 2003, both of which are incorporated herein by reference.

Employment of Information Regarding Proximity Networking Activity

According to various embodiments of the present invention, a mobile node and/or other computer may act to perform one or more operations using possessed information regarding proximity networking activity. Such possessed information regarding proximity networking activity might, in various embodiments, include information regarding proximity networking activity recorded by that mobile node and/or other computer, and/or information regarding proximity networking activity received by that mobile node and/or other computer from other mobile nodes and/or other computers.

For instance, the mobile node and/or other computer might, perhaps via a GUI and/or other interface, act to make various of its possessed information regarding proximity networking activity available to its user. Such functionality might be implemented in a number of ways. With respect to FIG. 2 it is noted that, according to various embodiments, the mobile node and/or other computer might act to present one or more maps to its user (step 203). Such a map might, for instance, depict an area (e.g., a city, a portion of a city, a campus, a park, or a building) and provide presentation of one or more instances of proximity networking activity taking place at that area.

For example, an indicator corresponding to a proximity networking activity instance might be placed on a portion of the map corresponding to the location where the activity was taking place. As another example, an indicator corresponding to a proximity networking activity instance might, perhaps visually, indicate the type of proximity networking activity. For instance, an indicator portraying a joystick might be employed to depict proximity gaming, an indicator portraying an envelope might be employed to depict proximity messaging, an indicator portraying a speaker might be employed to depict proximity audio media streaming, an indicator portraying a television set might be employed to depict proximity video media streaming, an indicator portraying a diskette might be employed to depict proximity file sharing, an indicator portraying a camera might be employed to depict proximity picture taking, and/or an indicator portraying a gear might be employed to depict proximity grid computing.

As yet another example, an indicator corresponding to a proximity networking activity instance might, perhaps visually, indicate various other information regarding proximity networking activity (e.g., information regarding proximity networking activity of the sort discussed above). Accordingly, for example, an indicator portraying an open door might be employed to depict a proximity networking activity instance that is open to new participants and/or an indicator portraying a closed door might be employed to depict a proximity networking activity instance that is not open to new participants. As another example, an indicator portraying an hourglass might be employed to depict how long a proximity networking activity instance has been going on (perhaps with greater accumulation at the bottom of the hourglass indicating greater time duration).

As yet another example, an indicator portraying a pile of coins might be employed to depict a fee requirement for participating in a proximity networking activity instance (perhaps with a greater number of coins indicating a greater fee). As still another example, an indicator portraying an insignia of a particular group might be employed to depict a membership requirement for a proximity networking activity instance. As a further example, an indicator portraying a cluster of people might be employed to depict a number of users participating in a proximity networking activity instance (perhaps with a larger cluster indicating a larger number of users).

It is noted that, in various embodiments, an indicator may portray a plurality of information regarding a proximity networking activity instance. For instance, an indicator might portray a joystick having superimposed thereon a pile of coins, a cluster of people, and an open door, and be placed on a certain portion of a map to depict proximity gaming with a certain fee requirement and a certain number of participating users that is open to new participants and which is taking place at a certain location.

Figure 2:
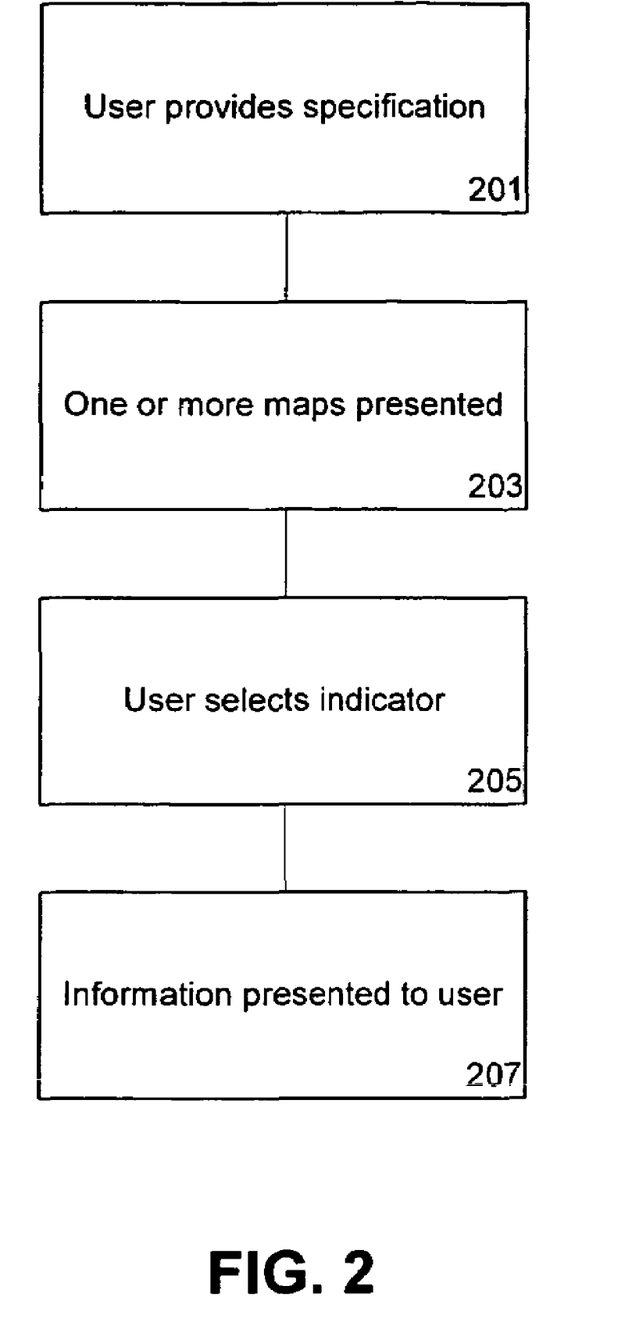
FIG. 2. shows exemplary steps involved in employment of information regarding proximity networking activity according to various embodiments of the present invention.

With further respect to FIG. 2 it is noted that, in various embodiments, a user's mobile node and/or other computer might act to present information regarding a proximity networking activity instance to its user in response to its user selecting an indicator, corresponding to a proximity networking activity instance, presented by the mobile node and/or other computer (steps 205, 207). Such selection and presentation might, for instance, be via a GUI and/or other interface provided by the mobile node and/or other computer. The information so presented might, for example, be information not depicted by the selected indicator. For instance, where an indicator depicted proximity audio media streaming with a certain fee requirement which is taking place at a certain location, the mobile node and/or other computer might respond to selection of the indicator by informing its user as to how long the proximity networking activity instance has been going on.

It is noted that, according to various embodiments, indicators might be presented to a user via operation of middleware running on a mobile node and/or other computer of the user. It is further noted that, in various embodiments, a user purchasing and/or receiving proximity networking activity software (e.g., proximity gaming software for a particular game) might be provided with not only the proximity networking activity software, but also with middleware and/or one or more updates to middleware already possessed by the mobile node and/or other computer. Such provided middleware and/or updates might, for instance, provide for indication presentation functionality and/or various other functionality discussed herein. Accordingly, such middleware and/or updates might, for example, act to allow a user to become more closely connected to a community associated with the proximity networking activity software (e.g., a gaming community) by virtue, for instance, of the user learning of locations where appropriate proximity networking activity is taking place (e.g., locations where a particular proximity networking game is being played).

Figure 3:
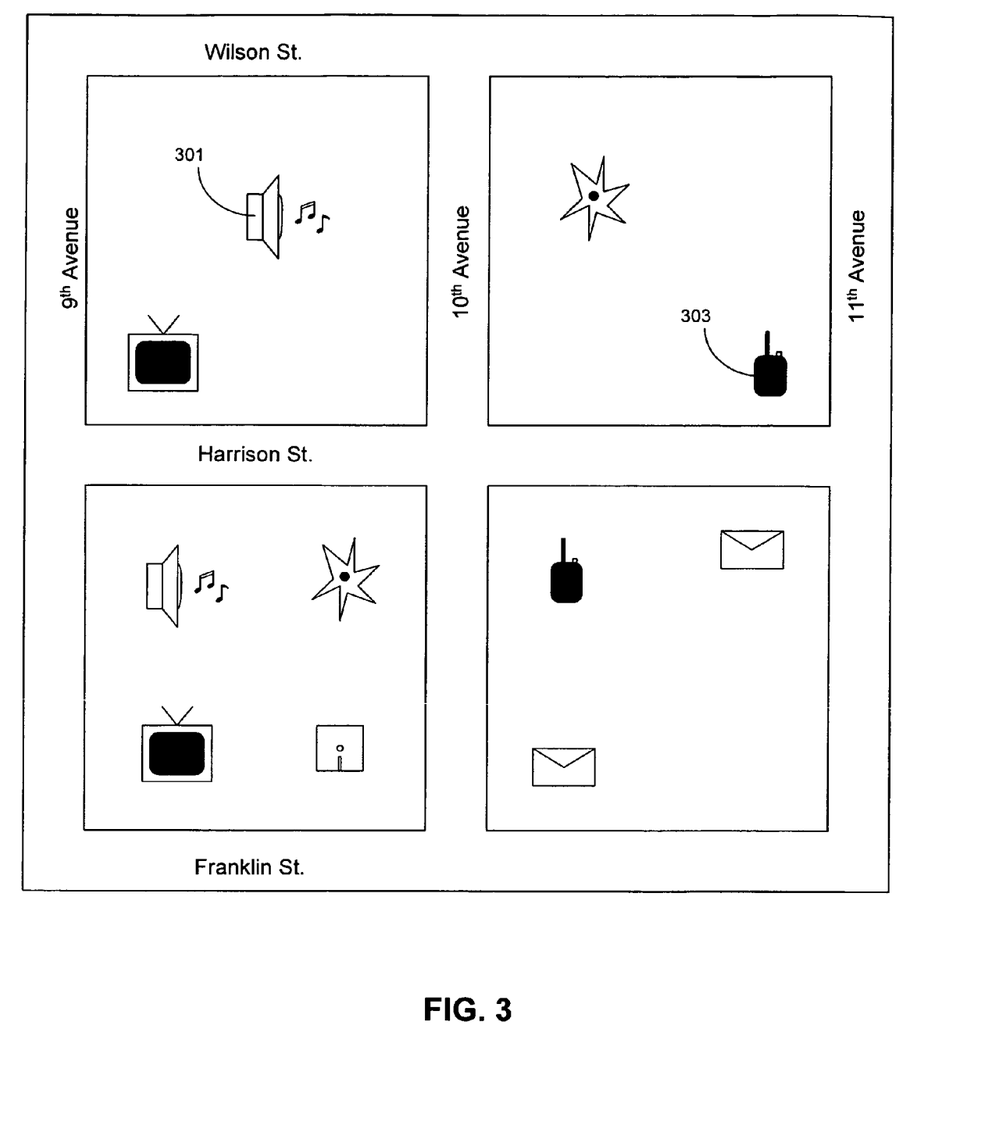
FIG. 3 shows an exemplary map according to various embodiments of the present invention.

Shown in FIG. 3 is an exemplary map according to various embodiments of the present invention including indicators 301 and 303. In this exemplary map, the placement of indicator 301 indicates a proximity networking activity instance occurring within an area bordered by $9^{th}$ Ave., $10^{th}$ Ave., Wilson St., and Harrison St, while the placement of indicator 303 indicates a proximity networking activity instance occurring within an area bordered by $10^{th}$ Ave., $11^{th}$ Ave., Wilson St., and Harrison St.

It is noted that a mobile node and/or other computer might, in various embodiments of the present invention, make various of its possessed information regarding proximity networking activity available to its user via browsable menus and/or queries. Moreover, in various embodiments, a mobile node and/or other computer might act to inform its user of proximity networking activities that are near the user's present location. For example, a provided map might be centered at the user's present location.

With further respect to FIG. 2 it is noted that, according to various embodiments, a user may be able to, perhaps via GUI and/or other interface, provide specification as to proximity networking activity instances she wishes to learn about (step 201). For example, the user might be able to specify that she only wishes to learn about proximity networking activity instances of one or more certain types (e.g., proximity gaming and/or proximity messaging), instances having certain fee properties (e.g., no fee requirement and/or a fee requirement of no more than a specified value), instances having certain time properties (e.g., having been going on for at least a specified amount of time), and/or instances having certain user properties (e.g., having at least a specified number of users). Responsive to such action by its user a mobile node and/or other computer might, for example, make available to its user only information regarding proximity networking activity instances matching the user's specifications. Accordingly, for example, where its user specified proximity gaming without fee requirement, the mobile node and/or other computer might show on a provided map only indicators corresponding to proximity networking activity instances that met those criteria.

It is additionally noted that, in various embodiments, zoom functionality might be provided. For example, in the case where a mobile node and/or other computer presented a map to its user, the user might, perhaps via a GUI and/or other interface, be able to zoom in and out on the map. Functionality might, for instance, be such that by zooming out the user could view a larger region and corresponding proximity networking activity indicators, and by zooming in the user could view a smaller region and corresponding proximity networking activity indicators.

It is noted that, in various embodiments, less detail might be provided to user as she zoomed out on a map, and/or more detail might be provided to her as she zoomed in on a map. For example, proximity networking activity indicators might provide less information as a user zoomed out on a map, and more information as she zoomed in on the map. Accordingly, for instance, an indicator that indicated only location and type (e.g., proximity messaging) of a proximity networking activity instance when a user was more zoomed out on a map might additionally indicate time duration and number of users when she zoomed in. As another example, as a user zoomed out on map, indicators corresponding to single proximity networking activity instances might be combined in to indicators corresponding to pluralities of proximity networking activity instances. Accordingly, for example, as a user zoomed out on a map three indicators corresponding to three proximity gaming instances taking place in a park might be replaced with a single indicator.

It is further noted that, in various embodiments, timestamps associated with information regarding proximity networking activity could be accessible by users. Accordingly, a user might act to take into account such timestamps, for instance, when considering the timeliness of information regarding proximity networking activities, and/or when determining if a proximity networking activity instance was still going on.

It is additionally noted that, in various embodiments, information regarding proximity networking activity might, perhaps in view of associated timestamps, be considered to be valid only for certain periods of time. Such a time period might, for example, be specified by a system administrator, network provider, and/or corporation.

Fixed Node and/or other Computer Functionality

Fixed nodes and/or other computers (e.g., servers) may, according to various embodiments of the present invention, be employed. Such a fixed node and/or other computer might, for example, be placed by a system administrator, network provider, and/or corporation at a particular location. Various functionality of a fixed node and/or other computer might, in various embodiments, be analogous to that discussed above with respect to mobile nodes and/or other computers. Accordingly, for instance, various roles discussed above as being filled by mobile nodes and/other computers may, in various embodiments, be filled by mobile nodes and/or other computers, and/or by fixed nodes and/or other computers.

It is noted that, in various embodiments, a fixed node and/or other computer might not act to partake in proximity networking activity instances, but instead might perform operations including providing for receipt by other nodes and/or other computers (e.g., mobile nodes and/or other computers) information regarding proximity networking activity that it had received, the information having been recorded by mobile nodes and/or other computers and provided (e.g., by one or more mobile nodes and/or other computers) to the fixed node and/or other computer. The information regarding proximity networking activity might be made available by the fixed node and/or other computer to the other nodes and/or other computers (e.g., mobile nodes and/or other computers), for example, via proximity connection.

A fixed node and/or other computer might, in various embodiments, act to provide possessed information regarding proximity networking activity (e.g., received information regarding proximity networking activity) to other fixed nodes and/or other computers, and/or might receive from other fixed nodes and/or other computers information regarding proximity networking activity possessed by those fixed nodes and/or other computers (e.g., information regarding proximity networking activity that they had received). Such provision and/or receipt might, for example, involve non-proximity connection (e.g., UMTS, General Packet Radio Service (GPRS), and/or Wide Area Network (WAN) connectivity (e.g., internet connectivity) might be employed) and/or proximity connection.

Accordingly, for instance, a fixed node and/or other computer on one side of city might act to exchange information regarding proximity networking activity with a fixed node and/or other computer on another side of city. Via such operation, each fixed node and/or other computer might, for example, come to know of information regarding proximity networking activity for regions not in its vicinity. Each fixed node and/or other computer might, for example, then act to provide such information regarding proximity networking activity to mobile nodes and/or other computers in its vicinity. Thus, users of those mobile nodes and/or other computers could, for instance, be able to learn about (e.g., have available to them via maps provided by their mobile nodes and/or other computers) proximity networking activity instances in parts of the city other than the one where they were presently situated.

It is noted that, in various embodiments, a fixed node and/or computer might be able to receive from mobile nodes and/or other computers, via non-proximity connection, information regarding proximity networking activity. Such functionality might, for instance, be employed by a user of a mobile node and/or other computer that desired to voluntarily submit information regarding one or more proximity networking activity instances to one or more fixed nodes and/or other computers. A user might do so, for instance, where she hoped to make others aware of a proximity networking activity instance (e.g., where she hoped to attract new players to a proximity game).

It is further noted that, in various embodiments, a fixed node and/or computer might be able to provide possessed information regarding networking activity to mobile nodes and/or other computers via non-proximity connection.

Figure 4:
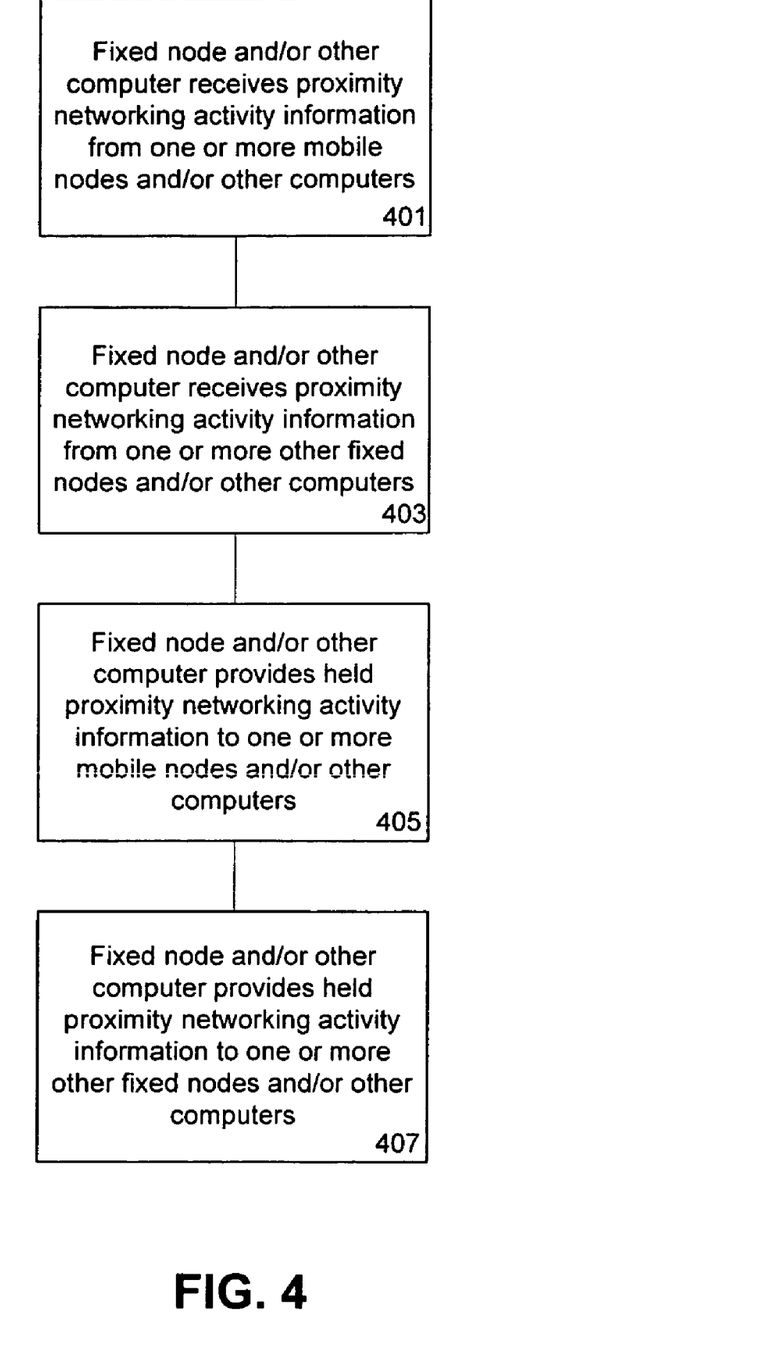
FIG. 4 shows exemplary steps involved in fixed node and/or other computer functionality according to various embodiments of the present invention.

With respect to FIG. 4 it is noted that, according to various embodiments of the present invention, a fixed node and/or other computer may be able to receive information regarding proximity networking activity from one or more mobile nodes and/or other computers, and/or from one or more other fixed nodes and/or other computers (steps 401, 403). Moreover, according to various embodiments of the present invention the fixed node and/or other computer may be able to provide held (e.g., received) information regarding proximity networking activity to one or more mobile nodes and/or other computers and/or to one or more other fixed nodes and/or other computers (steps 405, 407). Proximity and/or non-proximity connection might be involved in such operations.

According to various embodiments, a mobile node and/or other computer may act to employ non-proximity connection in receiving information regarding proximity networking activity from another mobile node and/or other computer. Moreover, according to various embodiments a mobile node and/or other computer may act to employ non-proximity connection in receiving information regarding proximity networking activity from a fixed node and/or other computer. Such functionality might be employed, for instance, in the case where a mobile node and/or other computer is not in proximity connection range with mobile nodes and/or other computers, and/or fixed nodes and/or other computers, possessing capabilities of providing information regarding proximity networking activity. In various embodiments, such functionality might be implemented using middleware.

It is noted that, in various embodiments, a mobile node and/or other computer may have access to (e.g., hold in an accessible store) information (e.g., network addresses) employable in contacting other mobile nodes and/or other computers, and/or fixed nodes and/or other computers and might, for example, employ such information in so receiving information regarding proximity networking activity.

Information regarding proximity networking activity so received might, for instance, be with respect to one or more particular areas, Accordingly, in various embodiments, such functionality might be employed in the case where a mobile node and/or other computer is not in proximity connection range with mobile nodes and/or other computers, and/or fixed nodes and/or other computers, in a particular area for which information regarding proximity networking activity is desired, and/or in proximity connection range with mobile nodes and/or other computers, and/or fixed nodes and/or other computers, possessing capabilities of providing information regarding proximity networking activity for a particular area for which information regarding proximity networking activity is desired.

As an example of fixed node and/or other computer operation, a fixed node and/or other computer might act to prepare historical statistics regarding possessed proximity networking activity information, the fixed node and/or other computer perhaps making the statistics available to other nodes and/or other computers (e.g., mobile nodes and/or other computers).

A variety of statistics might be prepared. For example, such statistics might include frequencies, perhaps with respect to certain time periods and/or areas, for various proximity networking activity information (e.g., types of proximity networking activities, numbers of users, and/or required fees).

Via such statistics, for example user might be able to determine how frequently proximity gaming took place at a particular location, how much it tended to cost, and/or how many users tended to participate. The user might, for instance, determine that one or more areas were likely to host proximity gaming of a desired cost and with a desired number of participants. The functionality by which the statistics could be made available might, for example, in implemented in a manner analogous to that discussed above. Having received such statistics, a node and/or other computer could make them available for access by its user, perhaps in a manner analogous to that discussed above.

As another example of fixed node and/or other computer operation, a fixed node and/or other computer might act to provide proximity networking activity software (e.g., proximity gaming software) to nodes and/or other computers (e.g., mobile nodes and/or other computers). Such provision might, for instance, involve the use of RMI, JMS, SOAP, OBEX OPP, email, MMS, and/or SMS. Proximity connection might, perhaps, be employed. The software might, for example, be sold for a fee. In various embodiments, a fixed node and/or other computer might act to provide proximity networking activity software relevant to participating in proximity networking activity instances in its vicinity. It is further noted that, in various embodiments, a fixed node and/or other computer might act to advertise (e.g., via messages dispatched via RMI, JMS, SOAP, OBEX OPP, email, MMS, and/or SMS) that it has proximity networking activity software available for dispatch. Proximity connection might, perhaps, be employed in such advertising.

According to various embodiments of the present invention, a user purchasing and/or receiving proximity networking activity software from a fixed node and/or other computer might, in various embodiments, receive at her mobile node and/or other computer from the fixed node and/or other computer information regarding proximity networking activity. The received information regarding proximity networking activity might, for example, indicate locations where proximity networking activity instances accessible using the software were taking place and/or likely to be taking place.

It is noted that, in various embodiments, storage of information regarding proximity networking activity at a fixed node and/or other computer might cause that information to exist longer than if it were only stored at users' mobile nodes and/or other computers. It is further noted that, in various embodiments, a fixed node and/or other computer might act to advertise (e.g., via messages dispatched via RMI, JMS, SOAP, OBEX OPP, email, MMS, and/or SMS) that it has information regarding proximity networking activity available for dispatch. Such advertising might, perhaps, employ proximity connection.

Hardware and Software

Various operations and/or the like described herein may be executed by and/or with the help of computers. Further, for example, devices described herein may be and/or may incorporate computers. The phrases "computer", "general purpose computer", and the like, as used herein, refer but are not limited to a smart card, a media device, a personal computer, an engineering workstation, a PC, a Macintosh, a PDA, a portable computer, a computerized watch, a wired or wireless terminal, phone, communication device, node, and/or the like, a server, a network access point, a network multicast point, a network device, a set-top box, a personal video recorder (PVR), a game console, a portable game device, a portable audio device, a portable media device, a portable video device, a television, a digital camera, a digital camcorder, a Global Positioning System (GPS) receiver, a wireless personal sever, or the like, or any combination thereof, perhaps running an operating system such as OS X, Linux, Darwin, Windows CE, Windows XP, Windows Server 2003, Palm OS, Symbian OS, or the like, perhaps employing the Series 40 Platform, Series 60 Platform, Series 80 Platform, and/or Series 90 Platform, and perhaps having support for Java and/or Net.

Figure 5:
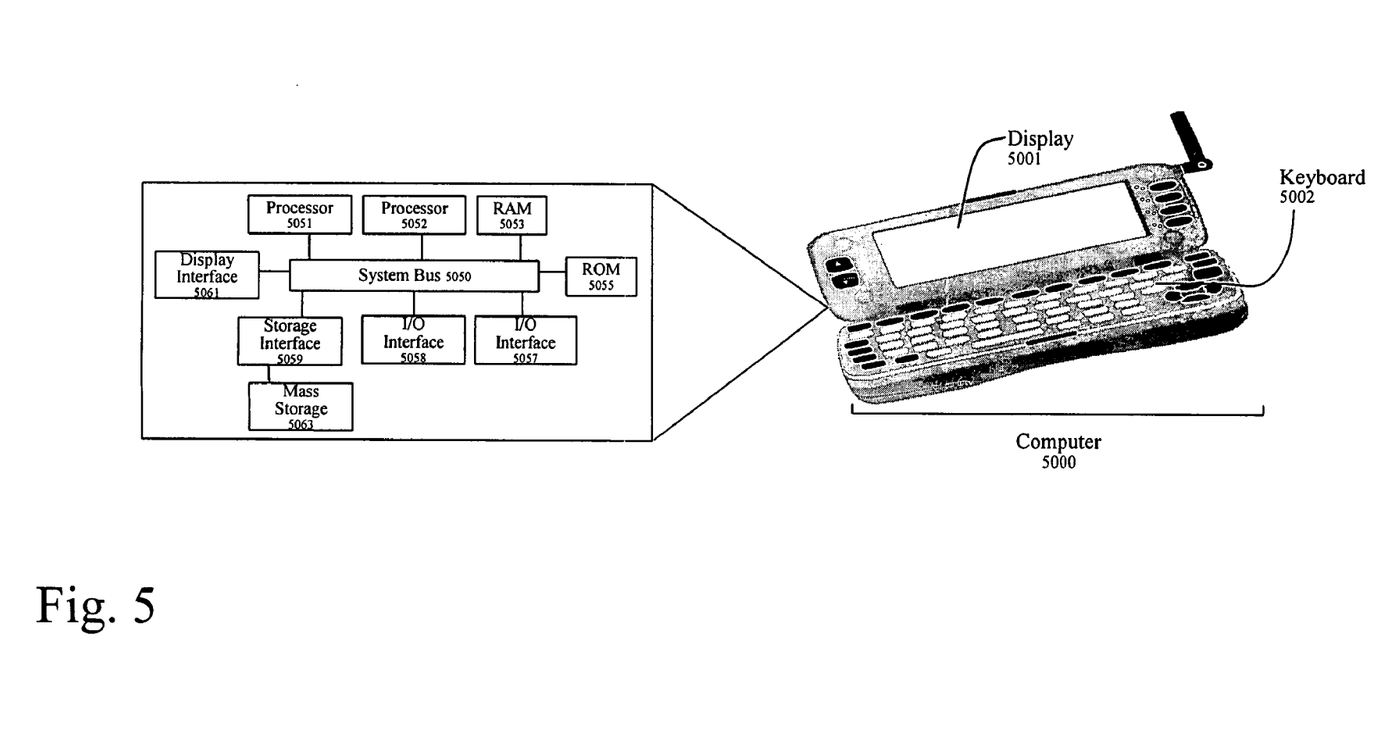
FIG. 5 shows an exemplary computer.

The phrases "general purpose computer", "computer", and the like also refer, but are not limited to, one or more processors operatively connected to one or more memory or storage units, wherein the memory or storage may contain data, algorithms, and/or program code, and the processor or processors may execute the program code and/or manipulate the program code, data, and/or algorithms. Shown in FIG. 5 is an exemplary computer employable in various embodiments of the present invention. Exemplary computer 5000 includes system bus 5050 which operatively connects two processors 5051 and 5052, random access memory 5053, read-only memory 5055, input output (I/O) interfaces 5057 and 5058, storage interface 5059, and display interface 5061. Storage interface 5059 in turn connects to mass storage 5063. Each of I/O interfaces 5057 and 5058 may, for example, be an Ethernet, IEEE 1394, IEEE 1394b, IEEE 802.11a, IEEE 802.11b, IEEE 802.11g, IEEE 802.11i, IEEE 802.11e, IEEE 802.11n, IEEE 802.15a, IEEE 802.16a, IEEE 802.16d, IEEE 802.16e, IEEE 802.16x, IEEE 802.20, IEEE 802.15.3, ZigBee, Bluetooth, Ultra Wide Band (UWB), Wireless Universal Serial Bus (WUSB), wireless Firewire, terrestrial digital video broadcast (DVB-T), satellite digital video broadcast (DVB-S), Advanced Television Systems Committee (ATSC), Integrated Services Digital Broadcasting (ISDB), Digital Audio Broadcast (DAB), General Packet Radio Service (GPRS), Universal Mobile Telecommunications Service (UMTS), Global System for Mobile Communications (GSM), DVB-H (Digital Video Broadcasting: Handhelds), IrDA (Infrared Data Association), and/or other interface.

Mass storage 5063 may be a hard drive, optical drive, a memory chip, or the like. Processors 5051 and 5052 may each be a commonly known processor such as an IBM or Motorola PowerPC, an AMD Athlon, an AMD Opteron, an Intel ARM, an Intel XScale, a Transmeta Crusoe, a Transmeta Efficeon, an Intel Xenon, an Intel Itanium, an Intel Pentium, or an IBM, Toshiba, or Sony Cell processor. Computer 5000 as shown in this example also includes a touch screen 5001 and a keyboard 5002. In various embodiments, a mouse, keypad, and/or interface might alternately or additionally be employed. Computer 5000 may additionally include or be attached to card readers, DVD drives, floppy disk drives, hard drives, memory cards, ROM, and/or the like whereby media containing program code (e.g., for performing various operations and/or the like described herein) may be inserted for the purpose of loading the code onto the computer.

In accordance with various embodiments of the present invention, a computer may run one or more software modules designed to perform one or more of the above-described operations. Such modules might, for example, be programmed using languages such as Java, Objective C, C, C#, C++, Perl, Python, and/or Comega according to methods known in the art. Corresponding program code might be placed on media such as, for example, DVD, CD-ROM, memory card, and/or floppy disk. It is noted that any described division of operations among particular software modules is for purposes of illustration, and that alternate divisions of operation may be employed. Accordingly, any operations discussed as being performed by one software module might instead be performed by a plurality of software modules. Similarly, any operations discussed as being performed by a plurality of modules might instead be performed by a single module. It is noted that operations disclosed as being performed by a particular computer might instead be performed by a plurality of computers. It is further noted that, in various embodiments, peer-to-peer and/or grid computing techniques may be employed.

Figure 6:
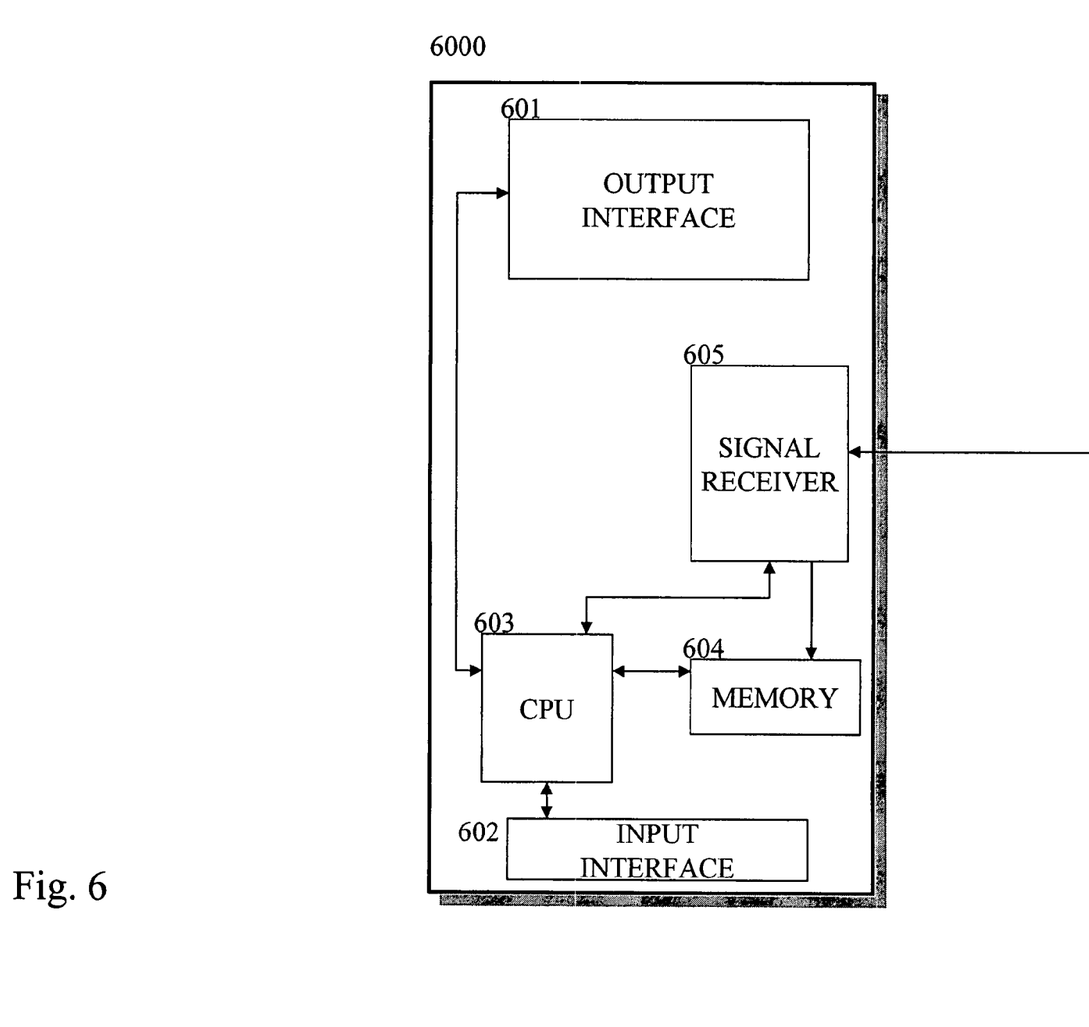
FIG. 6 shows a further exemplary computer.

Shown in FIG. 6 is a block diagram of a terminal, an exemplary computer employable in various embodiments of the present invention. In the following, corresponding reference signs are applied to corresponding parts. Exemplary terminal 6000 of FIG. 6 comprises a processing unit CPU 603, a signal receiver 605, and a user interface (601, 602). Signal receiver 605 may, for example, be a single-carrier or multi-carrier receiver. Signal receiver 605 and the user interface (601, 602) are coupled with the processing unit CPU 603. One or more direct memory access (DMA) channels may exist between multi-carrier signal terminal part 605 and memory 604. The user interface (601, 602) comprises a display and a keyboard to enable a user to use the terminal 6000. In addition, the user interface (601, 602) comprises a microphone and a speaker for receiving and producing audio signals. The user interface (601, 602) may also comprise voice recognition (not shown).

The processing unit CPU 603 comprises a microprocessor (not shown), memory 604 and possibly software. The software can be stored in the memory 604. The microprocessor controls, on the basis of the software, the operation of the terminal 6000, such as receiving of a data stream, tolerance of the impulse burst noise in data reception, displaying output in the user interface and the reading of inputs received from the user interface. The hardware contains circuitry for detecting signal, circuitry for demodulation, circuitry for detecting impulse, circuitry for blanking those samples of the symbol where significant amount of impulse noise is present, circuitry for calculating estimates, and circuitry for performing the corrections of the corrupted data.

Still referring to FIG. 6, alternatively, middleware or software implementation can be applied. The terminal 6000 can, for instance, be a hand-held device which a user can comfortably carry. The terminal 6000 can, for example, be a cellular mobile phone which comprises the multi-carrier signal terminal part 605 for receiving multicast transmission streams. Therefore, the terminal 6000 may possibly interact with the service providers.

Ramifications and Scope

Although the description above contains many specifics, these are merely provided to illustrate the invention and should not be construed as limitations of the invention's scope. Thus it will be apparent to those skilled in the art that various modifications and variations can be made in the system and processes of the present invention without departing from the spirit or scope of the invention.

In addition, the embodiments, features, methods, systems, and details of the invention that are described above in the application may be combined separately or in any combination to create or describe new embodiments of the invention.

What is claimed is:

1. A method, comprising:
   recording, at a first node, descriptive attributes of proximity node network activity instances, wherein the proximity node network activity instances are proximity node network activity instances in which the first node is capable of partaking via proximity network connection with one or more other nodes;
   providing some or all of the descriptive attributes to a second node, wherein the second node holds descriptive attributes of proximity node network activity instances;
   receiving at the first node from the second node some or all of the descriptive attributes held by the second node;
   informing a user of the first node of proximity node network activity instances associated with one or more geographical locations; and
   displaying at the first node a map with one or more indicators at geographical locations thereon, the indicators representing different types of proximity node network activities with different graphics,
   wherein one of descriptive attributes includes historical statistics regarding proximity network activity instances that have already occurred.

2. The method of claim 1, wherein the map shows streets at the one or more geographical locations, and
   the proximity node network activity types include at least two of proximity gaming, proximity messaging, proximity audio media streaming, proximity video media streaming, proximity file sharing, proximity picture taking, and proximity grid computing.

3. The method of claim 1, wherein the descriptive attributes recorded at the first node include geographical location information corresponding to each of the proximity node network activity instances in which the first node is capable of partaking.

4. The method of claim 1, wherein the descriptive attributes received at the first node are employed in updating descriptive attributes of proximity node network activity instances held by the first node.

5. The method of claim 1, wherein some or all of the descriptive attributes recorded at the first node include time information and are, based on associated timestamp information, valid for only certain periods of time.

6. The method of claim 1, wherein the first node and the second node communicate via proximity connection.

7. The method of claim 1, wherein one or more of the first node and the second node are mobile nodes.

8. The method of claim 1, wherein the descriptive attributes held by the first node include one of proximity gaming information, proximity messaging information, and proximity media streaming information.

9. The method of claim 1, wherein the first node includes a first software module associated with one of the network activity instances, and the second node includes a second software module associated with the one of the network activity instances, the method further comprising:
   determining whether the first software module and the second software module are identical.

10. The method of claim 9, wherein the first software module and the second software module are gaming software, and the historical statistics relate to the gaming software.

11. The method of claim 1, further comprising:
   participating by the first node in a proximity networking activity instance previously unknown to the first node; and
   subscribing by the first node to the second node to receive interprocess communication notifications.

12. The method of claim 1, wherein the map shows at least one of an indicator of close or open for participating the proximity node network activity instances, an indicator of a number of participants or how long the proximity node network activity instances have been going on, and an indicator of a fee or membership requirement for the proximity node network activity instances.

13. A computer-readable storage medium carrying one or more sequences of one or more instructions which, when executed by one or more processors, cause a first node to at least perform the following steps:

recording, at the first node, descriptive attributes of proximity node network activity instances, wherein the proximity node network activity instances are proximity node network activity instances in which the first node is capable of partaking via proximity network connection with one or more other nodes;

providing some or all of the descriptive attributes to a second node, wherein the second node holds descriptive attributes of proximity node network activity instances;

receiving at the first node from the second node some or all of the descriptive attributes held by the second node;

informing a user of the first node of proximity node network activity instances associated with one or more geographical locations; and displaying at the first node a map with one or more indicators at geographical locations thereon, the indicators representing different types of proximity node network activities with different graphics, wherein one of descriptive attributes includes historical statistics regarding proximity network activity instances that have already occurred.

14. The method of claim 1 further comprising preparing, at the first node, historical statistics corresponding to some or all of the descriptive attributes held by the first node.

15. The method of claim 1, further comprising:

updating some or all of descriptive attributes, held by the first node, of proximity node network activity instances in which one or more nodes are capable of partaking via proximity network connection with one or more other nodes, wherein some or all of descriptive attributes of proximity node network activity instances received at the first node are employed in the updating; and providing from the first node to a requesting node some or all of the descriptive attributes held by the first node.

16. The method of claim 15 wherein the first node communicates with at least one of a mobile node, a fixed node, and the requesting node via non-proximity connection.

17. A mobile node, comprising:

at least one processor; and at least one memory including computer program code, the at least one memory and the computer program code configured to, with the at least one processor, cause the mobile node to perform at least the following, record, at the mobile node, descriptive attributes of proximity node network activity instances, wherein the proximity node network activity instances are proximity node network activity instances in which the mobile node is capable of partaking via proximity network connection with one or more other nodes;

provide some or all of the descriptive attributes to a second node, wherein the second node holds descriptive attributes of proximity node network activity instances;

receive at the mobile node from the second node some or all of the descriptive attributes held by the second node;

inform a user of the mobile node of proximity node network activity instances associated with one or more geographical locations; and displaying at the first node a map with one or more indicators at geographical locations thereon, the indicators representing different types of proximity node network activities with different graphics, wherein one of descriptive attributes includes historical statistics regarding proximity network activity instances that have already occurred.

18. The mobile node of claim 17, wherein the map shows streets at the one or more geographical locations, and the proximity node network activity types include at least two of proximity gaming, proximity messaging, proximity audio media streaming, proximity video media streaming, proximity file sharing, proximity picture taking, and proximity grid computing.

19. The mobile node of claim 17, wherein the descriptive attributes recorded at the mobile node include geographical location information corresponding to each of the proximity node network activity instances in which the mobile node is capable of partaking.

20. The mobile node of claim 17, wherein the descriptive attributes received at the mobile node are employed in updating descriptive attributes of proximity node network activity instances held by the mobile node.

21. The mobile node of claim 17, wherein some or all of the descriptive attributes recorded at the mobile node include time information and are, based on associated timestamp information, valid for only certain periods of time.

22. The mobile node of claim 17, wherein the mobile node and the second node communicate via proximity connection.

23. The mobile node of claim 17, wherein the mobile node includes a first software module associated with one of the network activity instances, and one of the other nodes includes a second software module associated with the one of the network activity instances and the mobile node is further caused to determine whether the first software module and the second software module are identical.

24. The method of claim 23, wherein the first software module and the second software module are gaming software, and the historical statistics relate to the gaming software.

25. A network device, comprising:

at least one processor; and at least one memory including computer program code, the at least one memory and the computer program code configured to, with the at least one processor, cause the network device to perform at least the following, receive from a mobile node descriptive attributes of proximity node network activity instances;

receive from a fixed node descriptive attributes of proximity node network activity instances;

update some or all of held descriptive attributes of proximity node network activity instances in which one or more nodes are capable of partaking via proximity network connection with one or more other nodes, wherein some or all of received descriptive attributes of proximity node network activity instances are employed in the updating;

provide to a requesting node some or all of the held descriptive attributes; and cause, at least in part, to display at the requesting node a map with one or more indicators at geographical locations thereon, the indicators representing different types of proximity node network activities with different graphics, wherein some or all of the held descriptive attributes include geographical location information corresponding to one or more proximity node network activity instances and historical statistics regarding proximity network activity instances that have already occurred.

26. The network device of claim 25 wherein the processor further performs preparing historical statistics corresponding to some or all of the held descriptive attributes.

27. The network device of claim 25 wherein the network device communicates with at least one of the mobile node, the fixed node, and the requesting node via proximity connection.

28. The network device of claim 25 wherein the network device communicates with at least one of the mobile node, the fixed node, and the requesting node via non-proximity connection.

29. The network device of claim 25, wherein the held descriptive attributes include one of proximity gaming information, proximity messaging information, and proximity media streaming information.

* * * * *